US011017037B2

(12) United States Patent
Andreica et al.

(10) Patent No.: US 11,017,037 B2
(45) Date of Patent: May 25, 2021

(54) OBTAINING RESPONSIVE INFORMATION FROM MULTIPLE CORPORA

(71) Applicant: Google Inc., Mountain View, CA (US)

(72) Inventors: Mugurel Ionut Andreica, Adliswil (CH); Vladimir Vuskovic, Zollikerberg (CH); Gökhan Bakir, Zurich (CH); Marcin Nowak-Przygodzki, Bäch (CH)

(73) Assignee: GOOGLE LLC, Mountain View, CA (US)

( * ) Notice: Subject to any disclaimer, the term of this patent is extended or adjusted under 35 U.S.C. 154(b) by 390 days.

(21) Appl. No.: 15/703,205

(22) Filed: Sep. 13, 2017

(65) Prior Publication Data

US 2019/0005138 A1    Jan. 3, 2019

Related U.S. Application Data

(60) Provisional application No. 62/528,425, filed on Jul. 3, 2017.

(51) Int. Cl.
*G06F 16/9535* (2019.01)
*G06F 3/16* (2006.01)
(Continued)

(52) U.S. Cl.
CPC ......... *G06F 16/9535* (2019.01); *G06F 3/167* (2013.01); *G06F 9/453* (2018.02);
(Continued)

(58) Field of Classification Search
CPC ............ G06F 16/9532; G06F 16/9535; G06F 16/3329; G06F 16/338; G06F 3/167; G10L 15/1815
See application file for complete search history.

(56) References Cited

U.S. PATENT DOCUMENTS 7,953,720 B1    5/2011 Rohde et al.
8,392,394 B1 *  3/2013 Kumar ................. G06F 16/951
                                                707/706
(Continued)

FOREIGN PATENT DOCUMENTS

JP    2008021118    1/2008
JP    2014191272    10/2014
(Continued)

OTHER PUBLICATIONS

International Searching Authority, International Search Report and Written Opinion of PCT Ser. No. PCT/US2018/040650; 14 pages; dated Aug. 24, 2018.
(Continued)

*Primary Examiner* — Marc S Somers
(74) *Attorney, Agent, or Firm* — Middleton Reutlinger

(57) ABSTRACT

Techniques are described herein for automated assistants that search various alternative corpora for information. In various implementations, a method may include receiving, by an automated assistant via an input component of a first client device, a free form input, wherein the free form input includes a request for specific information; searching a general purpose corpus of online documents to obtain a first set of candidate response(s) to the request for specific information; searching a user-specific corpus of active document(s) to obtain a second set of candidate response(s) to the request for specific information; comparing the first and second sets of candidate responses; based on the comparing, selecting a given response to the request for specific information from the first or second set; and providing, by the automated assistant, output indicative of the given response.

15 Claims, 8 Drawing Sheets

(51) Int. Cl.
*G10L 15/18* (2013.01)
*G06F 16/332* (2019.01)
*G10L 13/00* (2006.01)
*G10L 15/22* (2006.01)
*G10L 25/51* (2013.01)
*G06F 9/451* (2018.01)

(52) U.S. Cl.
CPC .......... *G06F 16/3329* (2019.01); *G10L 13/00* (2013.01); *G10L 15/1815* (2013.01); *G10L 15/22* (2013.01); *G10L 25/51* (2013.01)

(56) References Cited

U.S. PATENT DOCUMENTS

| | | | |
|---|---|---|---|
| 8,666,730 | B2 | 3/2014 | Todhunter et al. |
| 9,135,250 | B1* | 9/2015 | Duddu ................ G06F 16/951 |
| 9,183,303 | B1* | 11/2015 | Goel .................. G06F 16/2228 |
| 9,477,759 | B2 | 10/2016 | Keysar et al. |
| 2002/0169764 | A1* | 11/2002 | Kincaid ............... G06F 16/358 |
| 2002/0198869 | A1* | 12/2002 | Barnett ............... G06F 16/951 |
| 2005/0102282 | A1* | 5/2005 | Linden .............. G06F 16/90324 |
| 2005/0165753 | A1* | 7/2005 | Chen .................. G06F 16/9535 |
| 2008/0313174 | A1* | 12/2008 | Barve .................. G06F 16/951 |
| 2013/0166543 | A1 | 6/2013 | MacDonald et al. |
| 2014/0081993 | A1* | 3/2014 | Redfern ............ G06F 16/24578 707/749 |
| 2014/0164400 | A1 | 6/2014 | Kruglick |
| 2014/0180672 | A1* | 6/2014 | Mo ..................... G06F 16/3344 704/9 |
| 2015/0278358 | A1 | 10/2015 | Abib et al. |
| 2016/0103876 | A1* | 4/2016 | Bakir ............... G06F 16/24534 707/722 |
| 2016/0378747 | A1 | 12/2016 | Orr et al. |
| 2018/0096203 | A1* | 4/2018 | King ..................... G06F 17/214 |
| 2018/0365318 | A1* | 12/2018 | Yi ......................... G06F 16/334 |

FOREIGN PATENT DOCUMENTS

| | | |
|---|---|---|
| JP | 2015060390 | 3/2015 |
| JP | 2015060391 | 3/2015 |
| KR | 20090069300 | 6/2009 |

OTHER PUBLICATIONS

Bhaskar, Pinaki; Answering Questions from Multiple Documents—the Role of Multi-Document Summarization; Proceedings of the Student Research Workshop associated with RANLP 2013, pp. 14-21, Hissar, Bulgaria, Sep. 9-11, 2013.

Grappy, et al. "Selecting answers to questions from Web documents by a robust validation process." Web Intelligence and Intelligent Agent Technology (WI-IAT), 2011 IEEE/WIC/ACM International Conference on. vol. 1. IEEE, 8 pages; 2011.

Jurafsky, et al.; Question Answering, Speech and Language Processing; 19 pages; dated Aug 7, 2017.

Japanese Patent Office; Notice of Reasons for Rejection issue in Application No. 2019-568318; 15 pages; dated Jan. 12, 2021.

Yasuharu, D.; A Multi-Purpose Electronic Dictionary for Morphological Analyzers; Journal of the Japanese Society for Artificial Intelligence; vol. 24, No. 5, pp. 640-646; dated Jan. 9, 2009.

Korean Patent Office; Notice of Office Action issue in Application No. KR2019-7036558; 19 pages; dated Jan. 25, 2021.

European Patent Office; Communication Pursuant to Article 94(3) EPC issued in Application No. 18743370.1; 9 pages; dated Feb. 17, 2021.

* cited by examiner

Model 123456789 from Fake Camera Company

-4x Optical Zoom
-Three attachable lenses
-HD video mode
-HD sound capture

AVG. CUST. RATING

You: What is the charging time?

+ DETAILED TECHNICAL SPECS

AA: The charging time is listed as two hours.

Product specifications

+ THIRD PARTY REVIEWS

ENTER MESSAGE 240      244

OBTAINING RESPONSIVE INFORMATION FROM MULTIPLE CORPORA

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands, queries, and/or requests (collectively referred to herein as "queries") using spoken natural language input (i.e. utterances, free-form input) which may in some cases be converted into text and then processed, and/or by providing textual (e.g., typed) natural language input.

Normally, when a user issues a request to a conventional automated assistant for specific information (e.g., asks a question), the conventional automated assistant might employ similar techniques as would be applied had the user simply issued the search to a search engine using a web browser. That is, a corpus of documents may be searched for responsive documents, the responsive documents may be ranked based on a variety of signals, and information extracted from one or more of the highest ranking responsive documents may be provided, e.g., in an informational box that includes, for instance, an excerpt of a responsive document that directly answers the user's question. In some cases, the search engine may go a step further and formulate its own natural language response (e.g., a sentence that directly answers the user's question) based on information contained in highly-ranked responsive documents. Either way, in the web browser search context, a list of responsive documents may be presented along with the responsive information. In the automated assistant context, particularly when the user engages the automated assistant using a display-less device such as a standalone interactive speaker, only the responsive information may be provided.

Some automated assistants may be able to disambiguate a user's request based on recently-consumed content/documents and/or a current conversational context of a human-to-computer dialog between the user and the automated assistant (e.g., recent user requests and/or recent automated assistant replies). Suppose a user asks an automated assistant the question, "What is the Capitol of Kentucky?" The automated assistant may retrieve responsive documents from a conventional (e.g., general purpose) corpus of documents (e.g., publicly available documents on the Internet) and, based on content of those responsive documents, formulate a response such as "The Capitol of Kentucky is Frankfort." Suppose the user next asks, "How far is that from Louisville?" Based on the user's previous search and/or the automated assistant's previous answer, the automated assistant may disambiguate the term "that" to "Frankfort" and reformulate the user's second question as, for instance, "How far is Frankfort from Louisville?" This reformulation may then be submitted as a standard, stand-alone search to the same conventional corpus of documents.

While automated assistants (and more generally, search engines) may be able to disambiguate (i.e. reformulate) a user's follow-up request based on a conversational context of a human-to-computer dialog, that reformulated follow-up request is still used to retrieve a new set of responsive documents from the same conventional corpus of documents as was used to respond to the user's previous request. Even though these new responsive documents may be ranked based on the conversational context of the dialog between the user and the automated assistant, there is no guarantee that the user's follow-up request will result in information being extracted from the same document as was used to provide a response to the user's previous request. Moreover, the automated assistant does not search other corpuses of documents that may be more immediately relevant, or "topical," to the user, such as documents currently being viewed or otherwise recently consumed by the user, or documents determined to be relevant to a user's current context (e.g., current location, active browsing session, active human-to-computer dialog, etc.).

SUMMARY

Techniques are described herein for implementing automated assistants that search outside of conventional, general purpose corpuses of online documents for information that is responsive to a user's request. In some implementations, an automated assistant configured with selected aspects of the present disclosure may expand and/or limit its search to a user-specific corpus of one or more "active" documents. "Active" documents (e.g., html/xml documents, videos, songs, presentations, pdf documents, emails, etc.) may include documents that are currently open (e.g., displayed) on a client device, documents from which the automated assistant audibly provided information to the user during a current human-to-computer dialog session between the user and the automated assistant, document(s) previously presented to the user during a current session in which the user operates a web browser, and so forth. In some implementations, documents that are loaded in memory of a client device, such as volatile memory, may be deemed "active," although this is not required.

Additionally or alternatively, an automated assistant configured with selected aspects of the present disclosure may expand and/or limit its search to a context-specific corpus of one or more documents that is identified based on a current context of the user. The user's current context may be determined based on various signals, such as position coordinates generated by a client device, recent searching activity that may be used, for instance, to identify one or more topics that are currently relevant to the user, and so forth. While they may overlap in some ways, a context-specific corpus of documents is different from a user-specific corpus of active documents because there is no requirement that documents of the context-specific corpus be "active," although there is no rule against it, either. In some embodiments, both user-specific corpora and context-specific corpora may be searched in tandem, e.g., in conjunction with a more conventional search of general purpose corpora of online documents.

In some implementations, the automated assistant may provide responsive information obtained from the user-specific corpus of active documents or the context-specific corpus to the exclusion of other potentially-responsive information obtained from a more conventional corpus of documents. Additionally or alternatively, in some implementations, the automated assistant may bias or promote responsive information extracted from documents obtained from user/context specific corpora over responsive information obtained from a more conventional corpus of documents.

Active documents in user-specific corpora may be examined by automated assistants for responsive content in various ways. In some embodiments, a network identifier such as a Uniform Resource Locator ("URL") associated with an online document may be provided, e.g., by a client device operated by a user, to an automated assistant (which as described below may be implemented at least in part on one or more computing systems that collectively form a so-called "cloud"). The automated assistant may submit this network identifier, as part of a (e.g., specially tailored) search query that also includes the user's request, to a standard search engine for searching a conventional corpus of documents. In addition to retrieving responsive content from the conventional corpus of documents, the network identifier may be used to locate the active document. In some implementations, responsive content extracted from the active document may be biased or promoted over content extracted from more conventional responsive search results, although in many cases this may occur organically because the conventional responsive search results may have limited relevance due to potential ambiguity of the user's request. In other implementations, the search may be restricted to the active document(s), to the exclusion of the conventional corpus of documents.

Additionally or alternatively, in some implementations, an automated assistant may employ techniques described herein only in situations in which a user's request is too ambiguous to generate an appropriate response, and there are no other signals usable to disambiguate the request. For example, if a user issues a request (e.g., "what is the capitol of France?") that is unambiguous and returns highly responsive search results, then an automated assistant may seek responsive information from a conventional general purpose corpus of online documents. However, suppose the user issues an ambiguous request that is unresolvable without the automated assistant prompting the user for disambiguating information. In some implementations, the automated assistant may, before providing such prompts, examine active documents or documents in a context-specific corpus to attempt to identify information that is responsive to the user's request.

In some implementations, a method performed by one or more processors is provided that includes: receiving, by an automated assistant via an input component of a first client device of one or more client devices operated by a user, a free form input, wherein the free form input includes a request for specific information; searching a general purpose corpus of online documents to obtain a first set of one or more candidate responses to the request for specific information; searching a user-specific corpus of one or more active documents to obtain a second set of one or more candidate responses to the request for specific information; comparing the first and second sets of candidate responses; based on the comparing, selecting a given response to the request for specific information from the first or second set; and providing, by the automated assistant, via one or more of the client devices operated by the user, output indicative of the given response.

These and other implementations of technology disclosed herein may optionally include one or more of the following features.

In various implementations, the user-specific corpus of one or more active documents may include a document currently displayed on a display device of one of the client devices operated by the user. In various implementations, the user-specific corpus of one or more active documents may include a document from which the automated assistant audibly provided information to the user during a current human-to-computer dialog session between the user and the automated assistant. In various implementations, the user-specific corpus of one or more active documents mat include a document previously presented to the user during a current session in which the user operates a web browser.

In various implementations, the user-specific corpus of one or more active documents may include a webpage that describes an entity, the request for specific information comprises a request for specific information about the entity, and the responsive content is responsive to the request for specific information about the entity. In various implementations, the second set of one or more candidate responses obtained from the user-specific corpus may be promoted over the first set of one or more candidate responses obtained from the general purpose corpus. In various implementations, the method may further include determining, based on the free form input, that the request for specific information is ambiguous, wherein the user-specific corpus of one or more active documents is searched based on the determining.

In another aspect, a method may include: receiving, by an automated assistant via an input component of a first client device of one or more client devices operated by a user, a free form input, wherein the free form input includes a request for specific information; determining, based on one or more signals generated at the first client device, a current context of the user; searching a general purpose corpus of online documents to obtain a first set of one or more candidate responses to the request for specific information; searching a separate context-specific corpus of one or more documents to obtain a second set of one or more candidate responses to the request for specific information, wherein the context-specific corpus is identified based on the current context of the user; comparing the first and second sets of candidate responses; based on the comparing, selecting a given response to the request for specific information from the first or second set; and providing, by the automated assistant, via one or more of the client devices operated by the user, output indicative of the given response.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
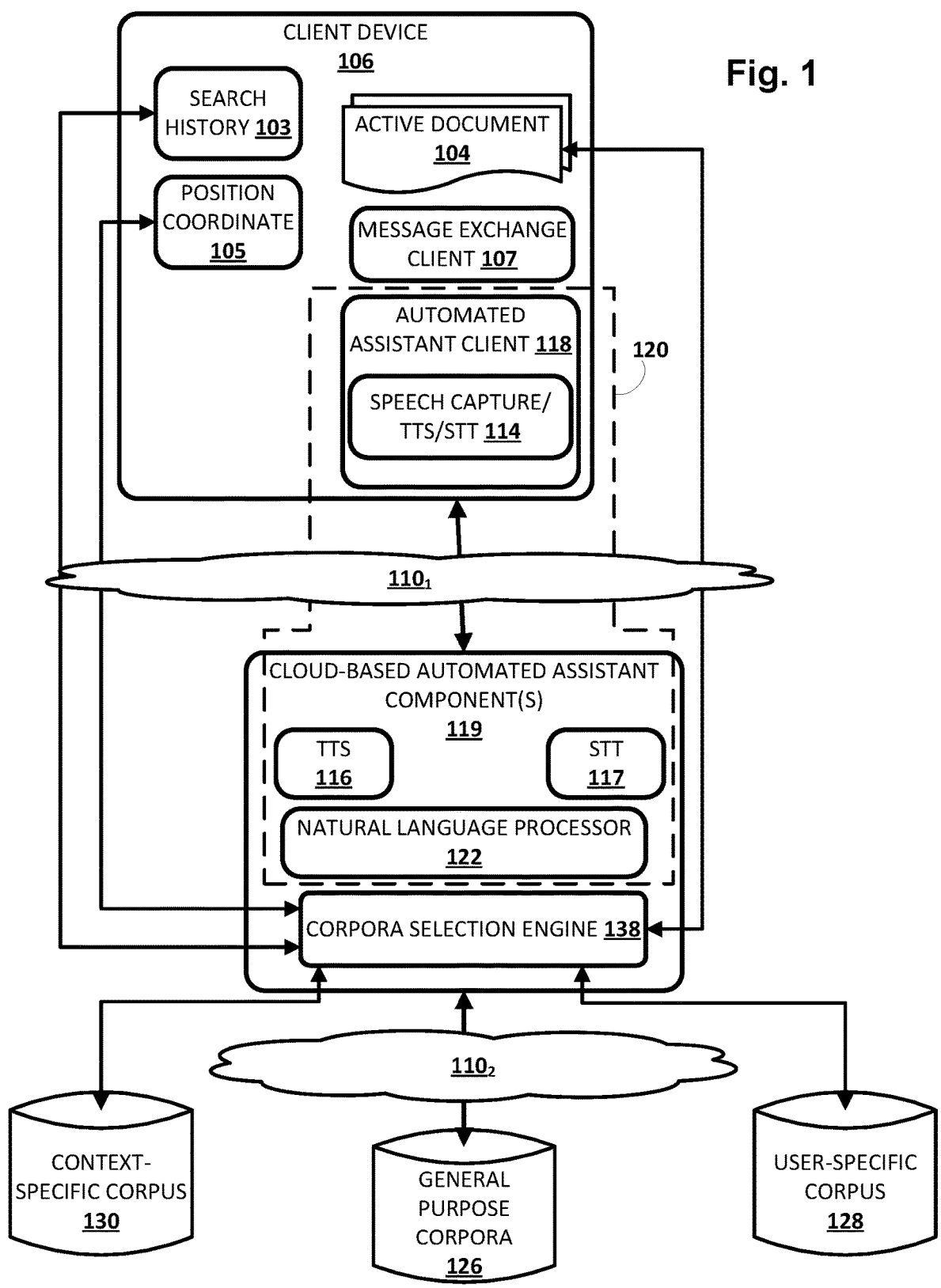
FIG. 1 is a block diagram of an example environment in which implementations disclosed herein may be implemented.

Now turning to FIG. 1, an example environment in which techniques disclosed herein may be implemented is illustrated. The example environment includes one or more client computing devices 106 (only one is depicted in FIG. 1 for the sakes of brevity and clarity). Client device 106 may execute an instance of an automated assistant client 118. One or more cloud-based automated assistant components 119, such as a natural language processor 122, may be implemented on one or more computing systems (collectively referred to as a "cloud" computing system) that are communicatively coupled to client device 106 via one or more local and/or wide area networks (e.g., the Internet) indicated generally at $110_1$.

As noted in the background, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 that is encompassed by a dashed line. It thus should be understood that each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118).

Client device 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, and/or a wearable apparatus of the user that includes a computing device (e.g., a watch of the user having a computing device, glasses of the user having a computing device, a virtual or augmented reality computing device). Additional and/or alternative client computing devices may be provided.

In some implementations, a given user may communicate with automated assistant 120 utilizing a plurality of client computing devices 106 that collectively from a coordinated "ecosystem" of computing devices. In some such implementations, automated assistant 120 may be considered to "serve" that given user, e.g., endowing automated assistant 120 with enhanced access to user-controlled content (e.g., resources, documents, etc.) for which access is controlled by the "served" user.

Client computing device 106 may operate a variety of different applications, such as a message exchange client 107 and the aforementioned automated assistant client 118. Message exchange client 107 may come in various forms and the forms may vary across client computing devices and/or multiple forms may be operated on a single client computing device 106. In some implementations, message exchange client 107 may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, message exchange client 107 may be implemented via a webpage or other resources rendered by a web browser (not depicted) or other application of client computing device 106.

As described in more detail herein, automated assistant 120 engages in human-to-computer dialog sessions with one or more users via user interface input and output device(s) of client device 106. In some implementations, automated assistant 120 may engage in a human-to-computer dialog session with a user in response to user interface input provided by the user via one or more user interface input devices of client devices 106. In some of those implementations, the user interface input is explicitly directed to automated assistant 120. For example, message exchange client 107 may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in message exchange client 107 based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input. In some implementations, automated assistant 120 may engage in a dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues.

As used herein, a "dialog session" may include a logically-self-contained exchange of one or more messages between a user and the automated assistant 120. The automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated speaker), locking/sleeping of the client device between sessions, change of client devices used to interface with one or more instances of the automated assistant 120, and so forth.

Each computing device depicted in FIG. 1 may include one or more memories for storage of data and software applications, one or more processors for accessing data and executing applications, and other components that facilitate communication over a network. The operations performed by client device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 118. In various embodiments, automated assistant client 118 may include a corresponding speech capture/text-to-speech ("TTS")/speech-to-text ("STT") module 114. In other implementations, one or more aspects of speech capture/TTS/STT module 114 may be implemented separately from automated assistant client 118.

Speech capture/TTS/STT module 114 may be configured to perform one or more functions: capture a user's speech, e.g., via a microphone (not depicted); convert that captured audio to text; and/or convert text to speech. For example, in some implementations, because client device 106 may be relatively constrained in terms of computing resources (e.g., processor cycles, memory, battery, etc.), the speech capture/TTS/STT module 114 that is local to client device 106 may be configured to convert a finite number of different spoken phrases—particularly phrases that invoke automated assistant 120—to text. Other speech input may be sent to cloud-based automated assistant components 119, which may include a cloud-based TTS module 116 and/or a cloud-based STT module 117.

STT module 117 may be configured to leverage the virtually limitless resources of the cloud to convert audio data captured by speech capture/TTS/STT module 114 into text (which may then be provided to natural language processor 122). TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/TTS/STT module 114, which may then convert the textual data into computer-generated speech that is output locally.

Automated assistant 120 (and in particular, cloud-based automated assistant components 119) may include a natural language processor 122, the aforementioned TTS module 116, the aforementioned STT module 117, a so-called "corpora selection engine" 138, and other components that are not depicted in FIG. 1. In some implementations, one or more of the engines and/or modules of automated assistant 120 may be omitted, combined, and/or implemented in a component that is separate from automated assistant 120. For example, corpora selection engine 138 can be implemented separately from automated assistant 120.

In some implementations, automated assistant 120 generates responsive content in response to various inputs generated by a user of client device 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in in response to free-form natural language input provided via client device 106. As used herein, free-form input is input that is formulated by a user and that is not constrained to a group of options presented for selection by the user.

Natural language processor 122 of automated assistant 120 processes natural language input generated at client device 106 and may generate annotated output for use by one or more other components of automated assistant 120. For example, the natural language processor 122 may process natural language free-form input that is generated by a user via one or more user interface input devices of client device 106. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

As noted above, in various embodiments, techniques are described herein for implementing automated assistant 120 so that it searches outside of conventional, general purpose corpuses of online documents for information that is responsive to a user's request. In FIG. 1, automated assistant 120 (and more particularly, cloud-based automated assistant component(s) 119) is in network communication with one or more general purpose corpora 126 of online documents via one or more networks (e.g., the Internet) indicated generally at 110₂. A general purpose corpus 126 of online documents may be a conventional datastore or index of online documents that is searchable by conventional search engines and/or is indexed using various conventional techniques.

As noted in the background, automated assistant 120 may have the ability to, at a user's request, search general purpose corpus 126 for specific information. For example, a user may ask, "What is the capitol of Germany?" Automated assistant 120 may forward this search (in original form or reformulated) to a search engine (not depicted), which in turn may search general purpose corpus 126 for responsive documents. In many cases, the search engine (or automated assistant 120, or another component) may extract information from one or more responsive documents that is directly responsive to the user's question, such as the city "Berlin." In some cases, automated assistant 120 or another component (e.g., the search engine) may formulate the extracted information into a complete sentence to be output to the user, such as "Berlin is the capitol of Germany."

In addition to or instead of the above conventional searching, techniques described herein may enable searching of other, potentially more relevant (or "topical") corpora of documents for responsive information. By doing so, it may be easier to respond to ambiguous user questions without prompting the user for disambiguation. Additionally or alternatively, users may receive responsive information that is more directly on point or more relevant (or "topical") than might have been obtained by searching general purpose corpus 126 alone. In various embodiments, these alternative corpora may be generated, e.g., by corpora selection engine 138, on an as-needed basis, e.g., when a user submits a request, at the outset of a human-to-computer dialog session between a user and automated assistant 120, and so forth. In other implementations, these alternative corpora may be maintained and updated periodically to reflect a current context/state of a user and/or of client device 106. In some implementations, alternative corpora may be generated temporarily, e.g., on an as-needed basis, and then discarded when no longer needed (e.g., a human-to-computer dialog session between a user and automated assistant 120 is concluded).

For example, in some implementations, corpora selection engine 138 may be configured to generate and/or maintain alternative corpora of documents that may be more topical to a user at any given point in time than general purpose corpus 126. In FIG. 1, a user-specific corpus of documents 128 may be generated/maintained, e.g., by corpora selection engine 138, to include so-called "active" documents 104. As noted above, "active" documents 104 may include documents (e.g., web pages, word processing documents, pdf documents, videos, music files, emails, etc.) that are currently open (e.g., displayed) on client device 106 (or on another client device of a coordinated ecosystem of client devices that includes client device 106), documents from which automated assistant 120 audibly provided information to the user during a current human-to-computer dialog session between the user and automated assistant 120 (on any client device of a coordinated ecosystem of client devices, e.g., client device 106), document(s) presented to the user during a current session in which the user operates a web browser of client device 106, incoming streaming documents, and so forth. In some implementations, documents that are loaded in memory (e.g., volatile memory) of client device 106 (or in another client device of a coordinated ecosystem) may be deemed "active," although this is not required. In some implementations, documents may be deemed active even if the software application in which they are open is operating in the background.

Generally speaking, active documents 104 are relatively highly likely to contain information that is currently relevant to the user because the user is operating, or has very recently operated, one or more client devices of a coordinated ecosystem of client devices to consume information contained in or otherwise associated with (e.g., as metadata) these documents. Thus, by providing user-specific corpus 128 of active documents 104 for searching, a user's question posed to automated assistant 120 may be used to search these likely relevant documents and potentially obtain more responsive information, especially to user requests for specific information. While active documents 104 are depicted in FIG. 1 as integral with client device 106, this is not meant to be limiting. In various implementations, identifiers of active documents, such as uniform resource locators ("URLs"), may be the only information that is stored on client device 106. In some such embodiments, client device 106 may provide the URL(s) to corpora selection engine 138, so that corpora selection engine 138 may obtain the documents for searching purposes. Additionally or alternatively, in various implementations, active documents (or identifiers thereof) may be maintained separately from client device 106, e.g., as part of a cloud-based user profile that is updated as the user consumes information from various documents.

Suppose a user is reading an article about a particular basketball team, e.g., via a web browser (not depicted) that displays a web page that includes the article text. Suppose the user asks automated assistant 120, "When is the last time they won a championship'?" Without any context, automated assistant 120 might need to seek disambiguating information from the user in order to respond to the question, such as "Whom are you referring to?" Using disclosed techniques, however, automated assistant 120, e.g., by way of corpora selection engine 138, may identify the current web page being viewed by the user as an active document that is part of user-specific corpus 128. Automated assistant 120 may then search (or request another component to search) user-specific corpus 128—including the currently-displayed web page—to determine that the document itself (or perhaps another document linked to by the active document) indicates that the basketball team last won the championship in 2012. Automated assistant 120 may then provide this information to the user, e.g., superimposed over the article text, as audible output, etc.

In some implementations, corpora selection engine 138 may additionally or alternatively generate and/or maintain one or more context-specific corpora of documents 130 that are identified based on a current context of the user. The user's current context may be determined based on various signals, such as position coordinates 105 generated by client device 106, recent searching activity 103 that may be used, for instance, to identify one or more topics that are currently relevant to the user, and so forth. Once the user's context is determined, it may be used to identify one or more documents (which may or may not also be active documents 104) that are likely pertinent to the user's current context.

For example, suppose a position coordinate 105 obtained from client device 106 indicates that a user is in a particular store, and that the user asks automated assistant 120, "Do they carry circular saws?" Without context, automated assistant 120 might need to seek disambiguating information from the user in order to respond to the question, such as "What do you mean by 'they'?" Using disclosed techniques, however, automated assistant 120, e.g., by way of corpora selection engine 138, may determine the user's current position coordinate 105 and match that to the particular store. This may enable corpora selection engine 138 to generate (e.g., update) context-specific corpus 130 to include, for instance, a web page associated with the particular store. Notably, it is not necessary that the user be viewing or have recently visited the store's web page—i.e. it is not necessary that the store's web page be an active document 104. Automated assistant 120 may then search (or request another component to search) context-specific corpus 130—including the store's web page—to determine that the store does or does not carry circular saws.

While they may overlap in some ways, context-specific corpus 130 is different from user-specific corpus 128 of active documents 104 because there is no requirement that documents of context-specific corpus 130 be "active," although there is no rule against it, either. In some embodiments, both user-specific corpora (128) and context-specific corpora (130) may be searched in tandem, e.g., in conjunction with a more conventional search of general purpose corpus of online documents (126). In various implementations, responsive information extracted from active documents 104 in user-specific corpus 128 and/or from context-specific corpus 130 may be presented alongside, instead of, and/or promoted over responsive information obtained from general purpose corpus 126. In some implementations, results from each corpus may be compared, e.g., ranked, and the highest ranking result(s), regardless of origin, may be used to provide responsive information to the user. Because documents in corpora 128 and 130 are likely more topical to user at the particular point in time, it is likely (but not guaranteed or required) that responses obtained from corpora 128/130 will be ranked higher than responses obtained from general purpose corpus 126.

Figure 2:
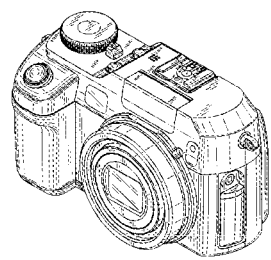
FIGS. 2, 3, 4, 5, and 6 depict examples in which disclosed techniques may be employed, in accordance with various implementations.

FIG. 2 depicts an example client device 206 in the form of a tablet computer or smart phone. Client device 206 in FIG. 2 includes a touch screen 240 and an input field 244 into which a user may provide free-form input (in textual or audio form) to automated assistant 120 (not depicted in FIG. 2). In other implementations, the user may invoke automated assistant 120 (e.g., including bringing up input field 244) by actuating one or more input components, such as a soft key, or by making a gesture. Currently displayed on touch screen 240 is a web page or other document (e.g., PDF, proprietary format textual document, etc.) associated with a hypothetical Model 123456789 camera by Fake Camera Corporation. Various information is presented about the camera, such as its optical zoom capability, number of attachable lenses, and high definition ("HD") modes. Also depicted are expandable elements for "Detailed Technical Specs," "User Reviews," and "Third Party Reviews." By selecting (e.g., clicking) an expandable element, hidden information associated with that selected expandable element may be revealed, e.g., as an "expansion" of text. In some implementations, the hidden information may be included in the web page, but may be hidden using various technologies, such as JavaScript.

If the user wishes to obtain more information about the camera, such as specific technical details, specific user reviews, etc., the user can operate the expandable elements to cause the hidden text to be revealed. Then the user can read the revealed text to manually find the desired information. However, an automated assistant 120 configured with selected aspects of the present disclosure can simplify this task greatly, e.g., reducing the number of inputs required by the user to find the necessary information, which can aid users with limited abilities to provide input (e.g., users that are driving, are physically impaired, etc.).

Figure 3:
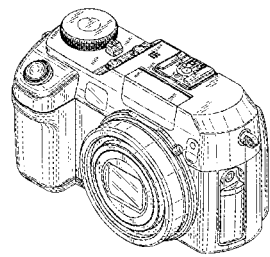
Figure 3:

FIG. 3 depicts an example of how automated assistant 120 may be engaged by the user in order to quickly track down specific information in the camera web page of FIG. 2. In FIG. 3, the user ("YOU" in FIG. 3) has provided input to automated assistant 120, e.g., by way of input field 244, that includes a request for specific information: "What is the charging time?" If such a question were submitted to automated assistant 120 in a vacuum without any context, automated assistant 120 may be required to obtain disambiguating information from the user. However, the user currently has the camera web page open on client device 206. In various implementations, the camera web page may be (or have been) identified, e.g., by corpora selection engine 138, as an active document that should be (or has already been) included (at least temporarily) in user-specific corpus 128.

Accordingly, in response to the user's search, automated assistant 120 is able to search, in addition to or instead of general purpose corpus 126, user-specific corpus 128 for information that is responsive to the user's question. Because user-specific corpus 128 includes, at least temporarily, the camera's web page, the camera's web page may be searched. Hidden text that is contained in the web page (while not initially visible to the user, the hidden text typically would be included in the underlying HTML/XML document) may be searched to find information indicative of the camera's charging time. That information may be reformulated if necessary (may not be necessary if the information is already contained in a complete sentence), and provided by automated assistant ("AA" in FIG. 3) to the user as depicted in FIG. 3: "The charging time is listed as two hours." In some implementations, automated assistant 120 may provide additional information, such as a hyperlink ("Product Specifications") to the location in the camera web page at which the charging time is included, in case the user would like to verify the answer.

In FIG. 3, the human-to-computer dialog between the user and automated assistant 120 is contained in balloons that are superimposed over the camera's web page. However, this is not meant to be limiting. In various implementations, particularly in which the user provides the query to automated assistant 120 audibly, automated assistant 120 may provide its response audibly. In such case, no balloons would be superimposed over the camera web page. Also, while the user's question is superimposed over the web page content in FIG. 3, in other implementations, the user's question may or may not be depicted visibly, e.g., so that more of the camera's web page remains visible even if automated assistant 120 provides its response visibly. And while in the example of FIG. 3 (and some other examples herein), only text is provided in response to the user's last question, this is not meant to be limiting. In various implementations, other types of information, such as images, sounds, video clips, etc., may be extracted from documents in alternative corpora.

Figure 4:

FIG. 4 depicts another example of techniques described herein being implemented. In FIG. 4, another client device 406 is depicted once again taking the form of a tablet or smart phone. However, this is not meant to be limiting, and techniques described herein may be implemented using a variety of different client device types, some of which are mentioned above. Client device 406 may include similar components as client device 206 of FIGS. 2-3.

In FIG. 4, the user is not operating client device 406 specifically to view a document. Instead, the user ("YOU" in FIG. 4) is engaged in a human-to-computer dialog session with automated assistant 120. The user begins by asking, "Where can I find the best Chinese food around here?" Automated assistant ("AA" in FIG. 4) 120 may determine the user's location, e.g., based on position coordinates 105, and may then perform a conventional search, e.g., via a search engine by way of general purpose corpus 126, to identify local Chinese restaurants (e.g., with 5-10 miles, etc.). These results may be ranked, e.g., by the search engine or by automated assistant 120, by user rankings, and then information from the highest ranking result may be presented by automated assistant 120 after the following statement: "Here is the highest rated Chinese restaurant in the area." In some implementations, automated assistant 120, e.g., by way of corpora selection engine 138, may identify one or more topics raised during this exchange, such as "restaurants," "Chinese restaurants," "Asian restaurants," etc. Based on these identified topics, corpora selection engine 138 may generate and/or update context-specific corpus 130 to include documents that pertain to these topics, such as restaurant reviews, user reviews (e.g., contained on a restaurant rating website), and so forth.

Next, the user asks, "Is it open for lunch?" As with at least some of the examples described herein, this request taken alone (i.e. without context) may be too ambiguous for automated assistant 120 to address without seeking additional disambiguating information from the user. However, using techniques described herein, automated assistant 120, e.g., by way of corpora selection engine 138, may generate (or update) context-specific corpus 130 based on the user's location to include documents such as a web page associated with the restaurant (which the user needn't have visited previously). The restaurant's web page may indicate that it is currently open. If there are no other documents in context-specific corpus 130 that contradict those hours, then automated assistant 120 might respond, "Yes, it is open now."

However, suppose the restaurant's web page is out of date. Suppose the restaurant has been closed in recent days/weeks for renovations, and that fact is not reflected on the restaurant's web page. In some implementations, automated assistant 120 (or another component on behalf of automated assistant 120) may search other documents in context-based corpus 130 in addition to the restaurant's web page to obtain more up-to-date information. For example, in FIG. 4, automated assistant 120 determines that, based on multiple reviews on a particular restaurant review website, the restaurant is currently closed for construction. Accordingly, automated assistant 120 responds, "While its website says it will be open, according to multiple reviewers on <website>, it is temporarily closed for construction." In some implementations, the information extracted from context-specific corpus 130 (e.g., the reviews) may be promoted/biased over information extracted from documents in general purpose corpus 126, making it more likely that the user would be properly informed of the restaurant being temporarily closed. On the other hand, had the reviews been detected as part of a conventional search of general purpose corpus 126, information extracted from the reviews may not have been promoted as heavily, and thus the user may not have been provided with the most up-to-date information.

Figure 5:
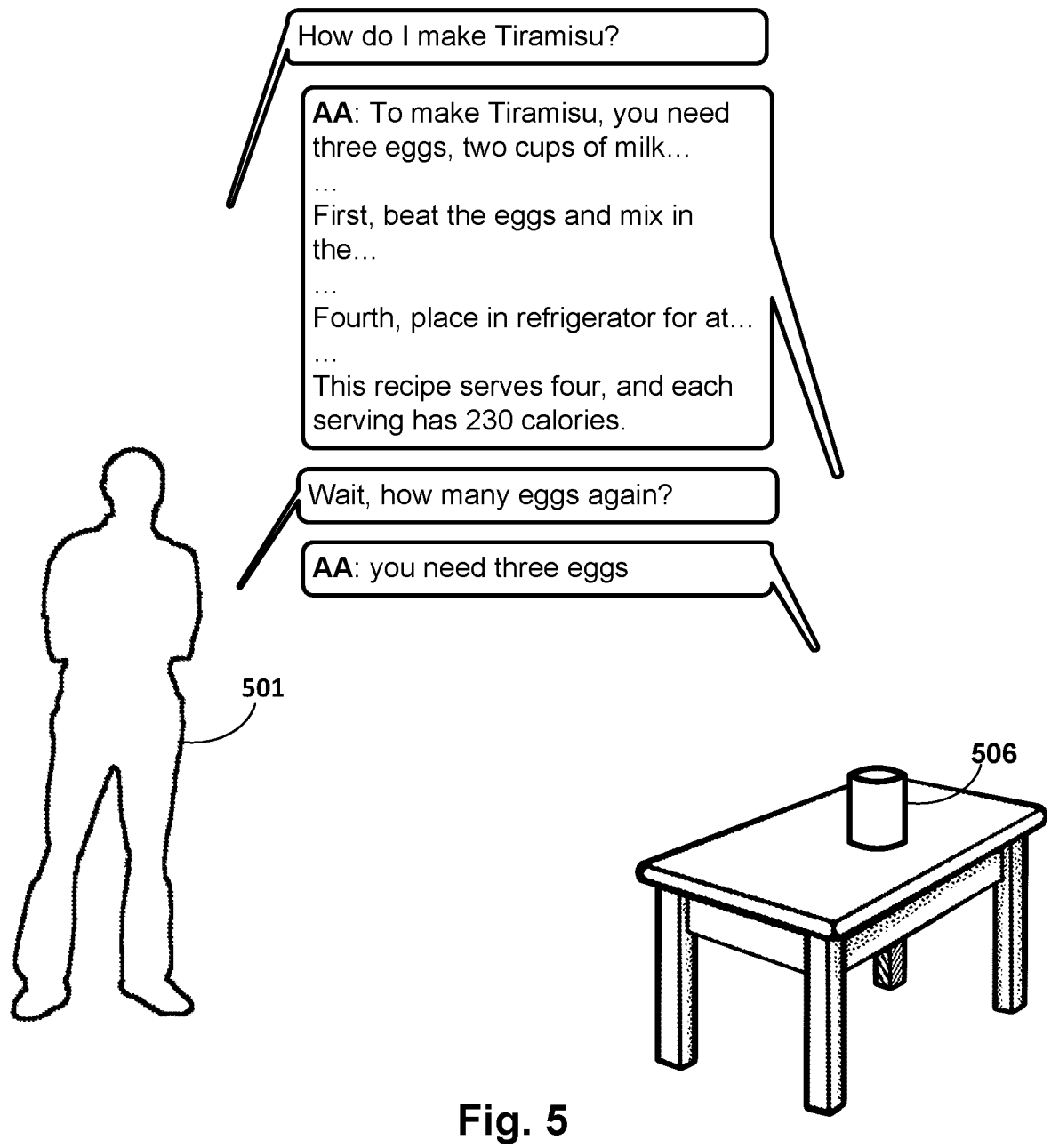

FIG. 5 demonstrates another example of techniques described herein being implemented during a human-to-computer dialog between a user 501 and a client device 506 taking the form of a standalone interactive speaker on which user 501 can audibly interact with automated assistant 120, e.g., by providing audio input that is detected by a microphone (not depicted) on client device 506. Client device 506 provides audible output via one or speakers (not depicted). In this example, the user 501 asks, "How do I make Tiramisu?" Automated assistant 120 (not depicted in FIG. 5; see FIG. 1) performs a search (or requests a search engine to perform a search) based on the user's question. This search locates, e.g., in general purpose corpus 126, a web page that includes a step-by-step recipe for making tiramisu. Automated assistant 120 extracts the ingredients and the steps from the web page and renders them audibly to the user 501.

Then, the user 501 asks, "Wait, how many eggs again?" This follow up question would be too ambiguous for a conventional automated assistant to respond to directly without additional context. Thus, a conventional automated would need to prompt the user for disambiguating information (e.g., "I'm sorry, I don't understand your question."). However, automated assistant 120 configured with selected aspects of the present disclosure may search alternative corpora (e.g., generated/maintained by corpora selection engine 138) of documents to obtain an answer directly. In this example, automated assistant 120 may search user-specific corpus 128 of active documents 104, which may include the web page from which automated assistant 120 read the ingredients and steps of the tiramisu recipe. In some implementations, this web page may still be loaded in memory of client device 506. In other implementations, automated assistant 120 may provide an identifier of the web page, such as its URL, along with the question to a search engine, and the search engine (which may be configured with selected aspects of the present disclosure) may promote any information extracted from the web page over other more conventional search results. In either case, automated assistant 120 is able to respond, "you need three eggs."

Techniques described herein are not limited to providing output on a client device currently being operated by a user. In some implementations, output may be provided on a different client device than that which is operated by the user at present, e.g., another client device of a coordinated ecosystem of client devices controlled by a user. Suppose a user is watching a particular movie on a smart TV. Suppose further that the smart TV forms part of the user's coordinated ecosystem of client devices, along with another client device in the form of a standalone speaker that is positioned near the TV. Now, suppose the user asks a question such as "What else has she been in?" As with examples described previously, this question is, without context, too ambiguous to answer directly. However, automated assistant 120, e.g., by way of corpora selection engine 138, may generate/maintain user-specific corpus 128 to include an active document in the form of the movie the user is watching. Thus, the user's question can be used to search user-specific corpus 128, in addition to or instead of general purpose corpus 126, for information that is directly responsive to the user's question. In this example, the movie being watched by the user, as an active document, can be used to determine that the user is referring to a particular actress in the film (e.g., an actress that is on screen when the user asks the question). For example, the actress may be identified in metadata associated with the movie file/stream.

Then, based on the identity of the actress, automated assistant 120 may be able to search additional data sources, e.g., as part of general purpose corpus 126, to identify other films starring the actress and audibly render that list to the user. In other implementations in which a secondary client device is not available, a list of movies featuring the actress may be presented by the smart TV, e.g., on screen (e.g., as superimposed text, side text, within a black bar, etc.) or audibly (in which case the movie's audio may be temporarily reduced, or the movie may be paused while the list is rendered audibly).

Figure 6:
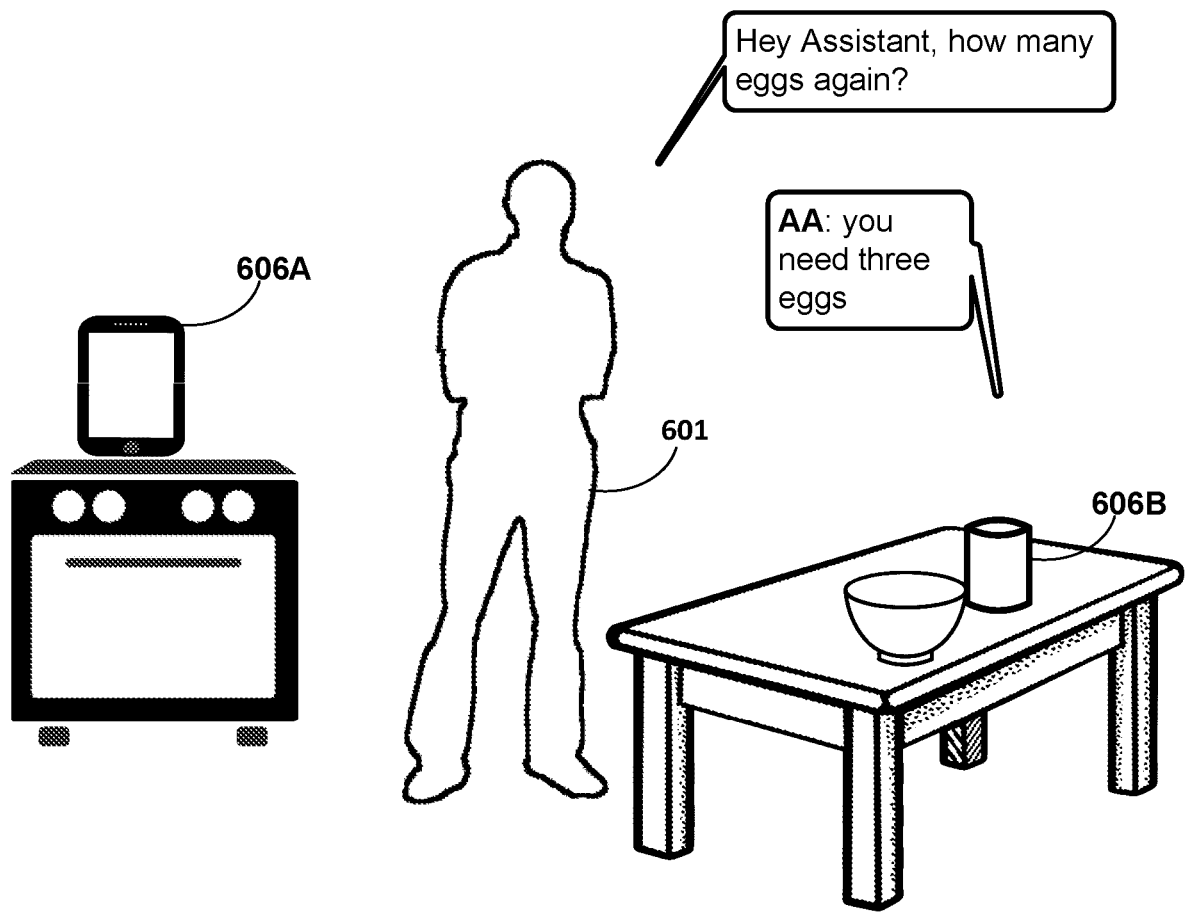

FIG. 6 depicts another example in which multiple client devices may cooperate to provide a user with information that is responsive to a request for specific information. In FIG. 6, a user 601 has opened a recipe web page on a first client device 606A that takes the form of a tablet computer, so that the user 601 can read the recipe visually while the tablet computer sits on a kitchen surface such as an oven. As described above, corpora selection engine 138 may add the web page with the recipe to user-specific corpus 128 as an active document 104. User-specific corpus 128 (as well as context-specific corpus 130) may be available across multiple client devices operated by the user 601. Later, suppose client device 606A has gone into standby mode, e.g., such that its screen is blank and is no longer displaying the recipe. Meanwhile, the user 601 may be in the midst of preparing the recipe and may, for instance, have ingredients on his hands that he would want to wash off before reactivating client device 606A to view the recipe again.

Instead of washing his hands to reactivate client device 606A, user 601 audibly asks the question, "Hey Assistant, how many eggs again?" The first part of his question, "Hey Assistant," may be a predetermined phrase that invokes automated assistant 120 on one or more client devices within hearing range, such as a second client device 606B that takes the form of a standalone interactive speaker (similar to client device 506). The remainder of his question may then be processed by automated assistant 120 as a query. Using techniques described herein, automated assistant 120 may perform a search using the query. Responsive results obtained from general-purpose corpus 126 may be low quality at best, and in some cases the user's question may be deemed too ambiguous to even perform a search of general-purpose corpus 126. However, when the user's question is used to search user-specific corpus 128, the web page with the recipe may be searched to determine an answer to the user's question. Consequently, automated assistant 120 is able to answer the user's question at client device 6066: "you need three eggs."

Figure 7:
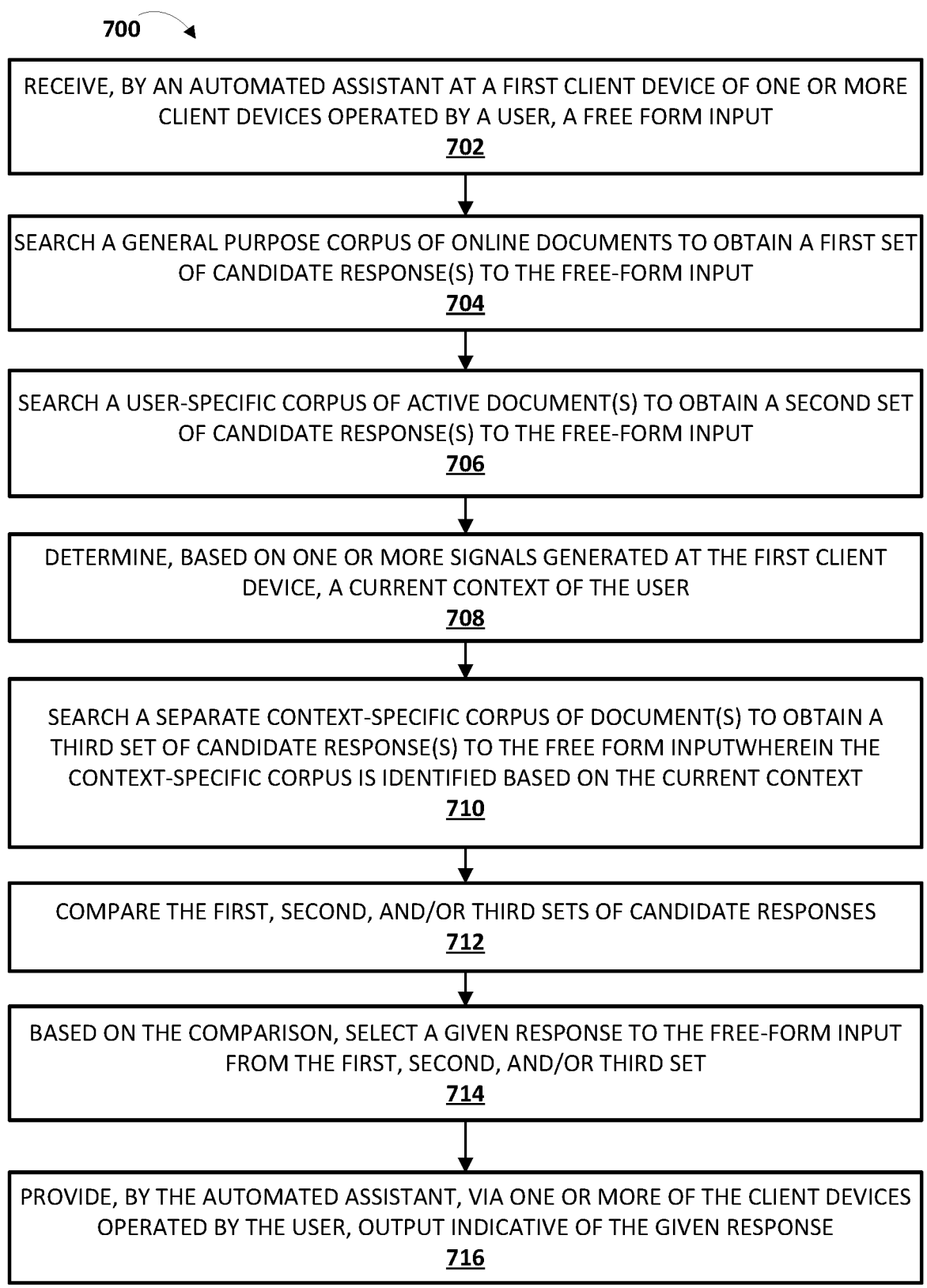
FIG. 7 depicts a flowchart illustrating an example method according to implementations disclosed herein.

FIG. 7 depicts an example method 700 for practicing selected aspects of the present disclosure, in accordance with various embodiments. For convenience, the operations of the flow chart are described with reference to a system that performs the operations. This system may include various components of various computer systems, including automated assistant 120 and/or corpora selection engine 138. Moreover, while operations of method 700 are shown in a particular order, this is not meant to be limiting. One or more operations may be reordered, omitted or added.

At block 702, the system may receive, e.g., by automated assistant 120 via an input component of a first client device of one or more client devices operated by a user (e.g., a coordinated ecosystem of client devices), a free form input. In various implementations, the free form input may include a request for specific information, such as a request for information about an entity (e.g., person, place, thing). In various implementations, the free-form input may be provided by the user using speech (which may be converted to text, e.g., by component 114 and/or 117) and/or via typed input.

At block 704, the system may search general purpose corpus 126 of online documents to obtain a first set of one or more candidate responses to the request for specific information. For example, automated assistant 120 may submit the user's free-form input as a search query to a conventional search engine. Various search engines may be configured to provide responses that include, for instance, an answer to the user's request for specific information formulated as a complete sentence. These answers may be presented, for example, in a box that is displayed separately from more "standard" search results such as matching documents.

At block 706, the system may search user-specific corpus 128 of one or more active documents 104 to obtain a second set of one or more candidate responses to the request for specific information. As noted above, user-specific corpus 128 may be generated/maintained by corpora selection engine 138 on an ongoing or as-needed basis. In some implementations, user-specific corpus 128 may include actual copies of active documents 104, which may be stored on one or more client devices 106 and/or on one or more remote computing systems forming part of a so-called "cloud" computing environment. In other implementations, at least some of the active documents 104 may be maintained in user-specific corpus 128 as document identifiers, e.g., URLs, that may be submitted as part of a search performed using a user's free-form input.

At block 708, the system may determine, e.g., based on one or more signals generated at the first client device, a current context of the user. A current context of the user may include, for instance, the user's location (e.g., determined by a position coordinate sensor such as a GPS sensor or a Wi-Fi or cellular triangulation scheme), one or more topics currently relevant (or "topical") to the user, etc. Relevant topics may be determined based on various signals, such as prior searches by the user during a current session, recent search history, recent browsing history, content of a human-to-computer dialog, etc.

In some implementations, topics may be determined using a topic classifier. Topic classifiers may take the form of machine learning models (supervised or unsupervised) or rules-based models. With machine learning-based topic classifiers, in some implementations, a topic classifier may be trained to provide output indicative of whether a particular topic is relevant, e.g., being discussed during a current human-to-computer dialog session, or mentioned in one or more recently consumed documents. In other implementations, a topic classifier may be trained to provide output indicative of whether a plurality of different topics are currently relevant. For example, a topic classifier may be configured to provide output indicating likelihoods or confidences that a plurality of different topics are being discussed in a human-to-computer dialog. In some implementations, only those topics that have likelihoods/confidences that satisfy one or more thresholds may be identified as relevant topics. In other implementations, only the n highest likelihood/confidence topics may be identified as relevant topics. Various known techniques may be employed for topic classification, including but not limited to expectation maximization, term frequency-inverse document frequency ("td-idf"), naïve Bayes classifiers, neural networks (e.g., instantaneously trained neural networks), support vector machines, various natural language processing approaches (e.g., topic segmentation), sentiment analysis, etc.

At block 710, the system may search context-specific corpus 130 of one or more documents to obtain a third set of one or more candidate responses to the free-form input. As noted above, in various embodiments, context-specific corpus 130 may be identified/generated/maintained based on the current context of the user determined at block 708. Thus, for instance, context-specific corpus 130 may include documents, web sites, or other sources of information that are highly likely to include relevant information. For example, suppose a user is currently engaged in a human-to-computer dialog session with automated assistant 120 that centers around the topic, "movies." In various implementations, an online database of information about movies (e.g., cast, crew, trivia, reviews, etc.) may be added (e.g., as a link) to context-specific corpus 130, and responsive information obtained from the database may be promoted over or even presented instead of responsive information obtained from general-purpose corpus 126.

At block 712, the system may compare the first, second, and/or third sets of candidate responses. For example, in some implementations, the system may examine relevance scores or rankings associated with the candidate responses. In some implementations, the system may rank all candidate responses in a single list, so that it can identify the highest ranking response, no matter which corpus the highest-ranking response was obtained from.

Based on the comparing, at block 714, the system may select a given response to the free-form input from the first, second, and/or third set. As noted above, in some implementations, the given response may simply be the highest ranking response, no matter which corpus it came from. At block 716, the system may provide, e.g., by way of automated assistant 120, via one or more of the client devices operated by the user, output indicative of the given response. Non-limiting examples of how such output may be provided are described above.

Figure 8:
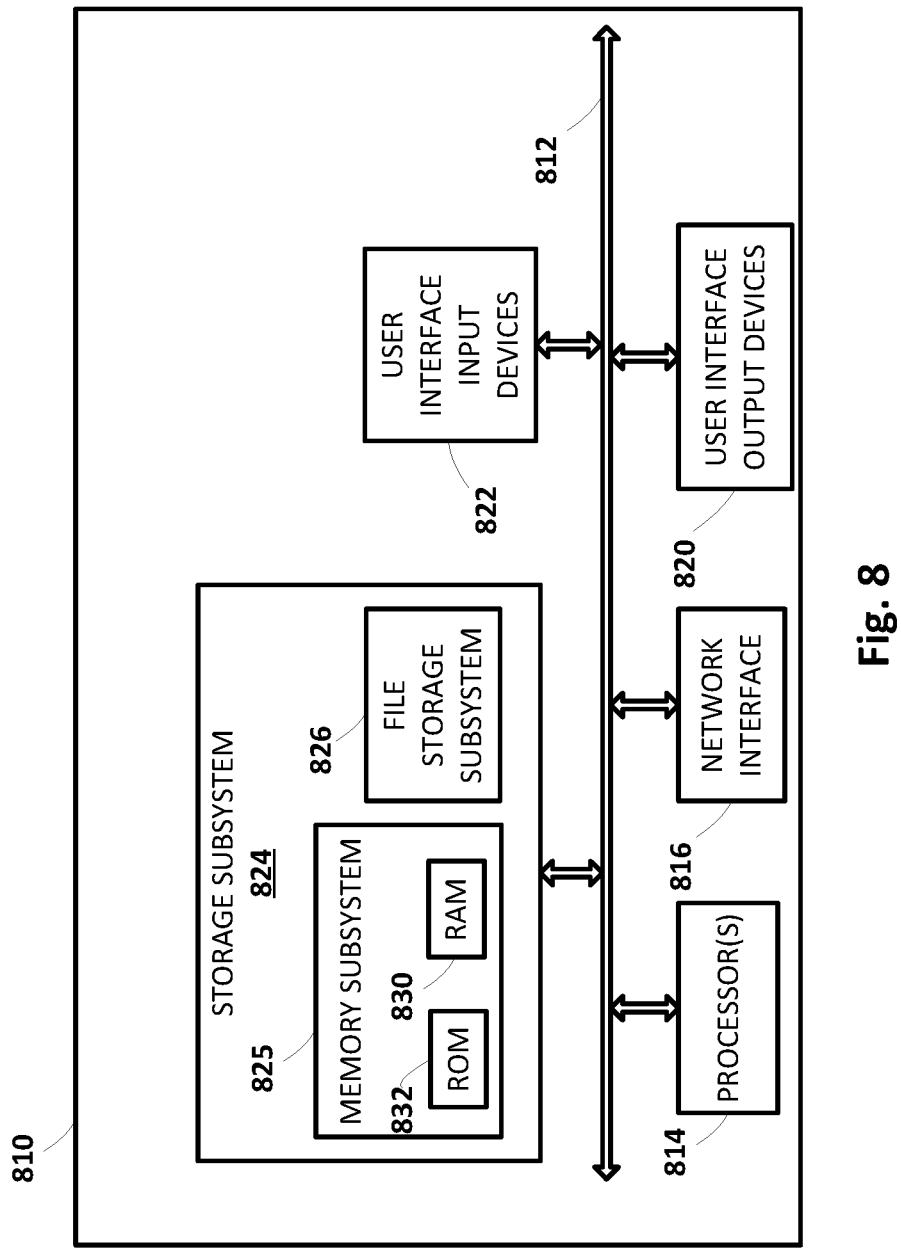
FIG. 8 illustrates an example architecture of a computing device.

FIG. 8 is a block diagram of an example computing device 810 that may optionally be utilized to perform one or more aspects of techniques described herein. In some implementations, one or more of a client computing device, user-controlled resources engine 130, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIG. 7, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method that is implemented on one or more processors, the method comprising:

receiving, by an automated assistant via an input component of a first client device of one or more client devices operated by a user, during a spoken human-to-computer dialog session between the user and the automated assistant, a free form speech input, wherein the free form speech input includes a request for specific information;

determining, based on one or more signals generated at the first client device, a current context of the user;

searching a general purpose corpus of online documents to obtain a first set of one or more candidate responses to the request for specific information, wherein the one or more candidate responses of the first set are extracted from online documents of the general purpose corpus;

searching a user-specific corpus of one or more active documents to obtain a second set of one or more candidate responses to the request for specific information, wherein the one or more candidate responses of the second set are extracted from documents of the user-specific corpus, and wherein the user-specific corpus is established prior to the receiving and includes a document from which the automated assistant audibly provided information to the user prior to the receiving, wherein the document was selected automatically from a plurality of search results obtained from the general purpose corpus of online documents based on a prior free form speech input of the user, wherein the prior free form speech input included a prior request of the user for specific information;

searching a separate context-specific corpus of one or more documents to obtain a third set of one or more candidate responses to the request for specific information, wherein the context-specific corpus is identified based on the current context of the user, wherein the one or more candidate responses of the third set are extracted from documents of the context-specific corpus;

comparing the first, second, and third sets of candidate responses;

based on the comparing, selecting a given response to the request for specific information from the first, second, or third set; and providing, by the automated assistant, via one or more of the client devices operated by the user, audible natural language output that conveys the given response.

2. The method of claim 1, wherein the user-specific corpus of one or more active documents includes a document currently displayed on a display device of one of the client devices operated by the user.

3. The method of claim 1, wherein the user-specific corpus of one or more active documents includes a document previously presented to the user during a current session in which the user operates a web browser.

4. The method of claim 1, wherein the user-specific corpus of one or more active documents includes a webpage that describes an entity, the request for specific information comprises a request for specific information about the entity, and the responsive content is responsive to the request for specific information about the entity.

5. The method of claim 1, wherein the second set of one or more candidate responses obtained from the user-specific corpus is promoted over the first set of one or more candidate responses obtained from the general purpose corpus.

6. The method of claim 1, further comprising determining, based on the free form speech input, that the request for specific information is ambiguous, wherein the user-specific corpus of one or more active documents is searched based on the determining.

7. The method of claim 1, wherein the current context of the user is generated based at least in part on a position coordinate generated by the first client device.

8. The method of claim 7, wherein the context-specific corpus of documents includes a document identified exclusively from the position coordinate.

9. The method of claim 1, wherein the third set of one or more candidate responses obtained from the context-specific corpus is promoted over the first set of one or more candidate responses obtained from the general purpose corpus.

10. The method of claim 1, wherein the context-specific corpus of one or more documents includes a document currently displayed on a display device of one of the client devices operated by the user.

11. The method of claim 1, wherein the context-specific corpus of one or more documents includes a document previously presented to the user during a current session in which the user operates a web browser.

12. At least one non-transitory computer-readable medium comprising instructions that, in response to execution of the instructions by one or more processors, cause the one or more processors to perform the following operations:
- receiving, by an automated assistant via an input component of a first client device of one or more client devices operated by a user, during a spoken human-to-computer dialog session between the user and the automated assistant, a free form speech input, wherein the free form speech input includes a request for specific information;
- determining, based on one or more signals generated at the first client device, a current context of the user;
- searching a general purpose corpus of online documents to obtain a first set of one or more candidate responses to the request for specific information, wherein the one or more candidate responses of the first set are extracted from online documents of the general purpose corpus;
- searching a user-specific corpus of one or more active documents to obtain a second set of one or more candidate responses to the request for specific information, wherein the one or more candidate responses of the second set are extracted from documents of the user-specific corpus, and wherein the user-specific corpus is established prior to the receiving and includes a document from which the automated assistant audibly provided information to the user prior to the receiving, wherein the document was selected automatically from a plurality of search results obtained from the general purpose corpus of online documents based on a prior free form speech input of the user, wherein the prior free form speech input included a prior request of the user for specific information;
- searching a separate context-specific corpus of one or more documents to obtain a third set of one or more candidate responses to the request for specific information, wherein the context-specific corpus is identified based on the current context of the user, wherein the one or more candidate responses of the third set are extracted from documents of the context-specific corpus;
- comparing the first, second, and third sets of candidate responses;
- based on the comparing, selecting a given response to the request for specific information from the first, second, or third set; and
- providing, by the automated assistant, via one or more of the client devices operated by the user, audible natural language output that conveys the given response.

13. The computer-readable medium of claim 12, wherein the user-specific corpus of one or more active documents includes a document currently displayed on a display device of one of the client devices operated by the user.

14. The computer-readable medium of claim 12, wherein the user-specific corpus of one or more active documents includes a document previously presented to the user during a current session in which the user operates a web browser.

15. A system comprising one or more processors and memory storing instructions that, in response to execution of the instructions by the one or more processors, cause the one or more processors to:
- receive, via an input component of a first client device of one or more client devices operated by a user, during a spoken human-to-computer dialog session between the user and an automated assistant, a free form speech input, wherein the free form speech input includes a request for specific information;
- determine, based on one or more signals generated at the first client device, a current context of the user;
- search a general purpose corpus of online documents to obtain a first set of one or more candidate responses to the request for specific information, wherein the one or more candidate responses of the first set are extracted from online documents of the general purpose corpus;
- search a user-specific corpus of one or more active documents to obtain a second set of one or more candidate responses to the request for specific information, wherein the one or more candidate responses of the second set are extracted from documents of the user-specific corpus, and wherein the user-specific corpus is established prior to the receiving and includes a document from which the automated assistant audibly provided information to the user prior to the receiving, wherein the document was selected automatically from a plurality of search results obtained from the general purpose corpus of online documents based on a prior free form speech input of the user, wherein the prior free form speech input included a prior request of the user for specific information;
- search a separate context-specific corpus of one or more documents to obtain a third set of one or more candidate responses to the request for specific information, wherein the context-specific corpus is identified based on the current context of the user, wherein the one or more candidate responses of the third set are extracted from documents of the context-specific corpus;
- compare the first, second, and third sets of candidate responses;
- based on the comparison, select a given response to the request for specific information from the first, second, or third set; and
- cause the automated assistant to provide, via one or more of the client devices operated by the user, audible natural language output that conveys the given response.

* * * * *